Figure 1:
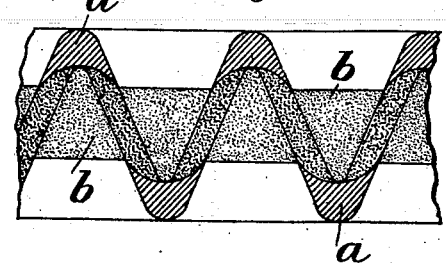

No. 650,247. Patented May 22, 1900.
F. HEIMEL.
ELECTRODE FOR SECONDARY BATTERIES.
(Application filed June 7, 1898.)

(No Model.)

Inventor
Franz Heimel
by
Richards & Co
Attorneys

Witnesses
Geo. E. Frech.

UNITED STATES PATENT OFFICE.

FRANZ HEIMEL, OF VIENNA, AUSTRIA-HUNGARY.

ELECTRODE FOR SECONDARY BATTERIES.

SPECIFICATION forming part of Letters Patent No. 650,247, dated May 22, 1900.

Application filed June 7, 1898. Serial No. 682,830. (No model.)

*To all whom it may concern:*

Be it known that I, FRANZ HEIMEL, a subject of the Emperor of Austria-Hungary, residing at Vienna, Austria-Hungary, have invented certain new and useful Improvements in Electrodes for Accumulators or Secondary Batteries, of which the following is a specification.

This invention relates to an improved electrode for accumulators or secondary batteries which is formed of metallic lead serving as the conducting material and peroxid of lead as the active mass.

Heretofore repeated trials have been made to make accumulator-electrodes in such a manner that the active mass was embedded in plate form between lead plates and the whole combination was perforated from one side. In this mode of manufacture the punches acting on the metal form a ridge on one side, while no ridge at all is formed on the other side. The consequence is that, on the one hand, the active mass finds no hold at the deflecting lead plate, and it detaches itself from the metal after few charges and loses contact with the same. On the other hand, one part of the mass is inclosed between the ridges on the other side, as the ridges of the individual perforations run in the same direction, so that the acid cannot penetrate to the ridges or at least much slower than to the mass not inclosed by the ridges. The mutual decomposition of the mass does not take place uniformly. Therefore it cannot expand and contract uniformly, and the consequence is that the mass inclosed between the ridges separates from the part not inclosed in a short time. The largest part of the active mass thus soon comes entirely out of contact with the metal, conducting off the current, and is ineffective then. These drawbacks are entirely remedied according to the present invention, in which the electrode-plates are perforated simultaneously from both sides with displaced punches. It is evident that by this mode of perforation the metal plates are provided with ridges uniformly—that is, the mass is held simultaneously at both sides and the acid has free access to the mass everywhere. This presents the further technical advantage that the electrode-plates will last much longer, as the easy and quick access of the oxid to the interior of the plate prevents the lead plates oxidizing too rapidly, which is the case when acid is lacking, when soluble oxid is formed. Moreover, the concentration of the acid need not be maintained too strong in the immediate vicinity of the active mass, as needed to be done in the former constructions for obtaining as quick a discharge as possible, and as a consequence the negative mass became sulfated very quickly.

The electrodes are composed of a plate-like layer of uniform thickness of the active material—such as red lead, lead sulfate, lead carbonate, peroxid of lead, or a mixture of any of these—which layer is closely surrounded by sheet-lead pressed thereon, the combined lead sheathing and internal layer of active material being then perforated with holes placed closely together, so that the total active mass is divided up into thin homogeneous layers which are in direct contact on two sides with the conducting sheet-lead, while they are riveted all around by the electrolyte in the holes. The lead mantle may be smooth or of other shape.

The accompanying drawings show several forms of such electrodes.

Figure 2:
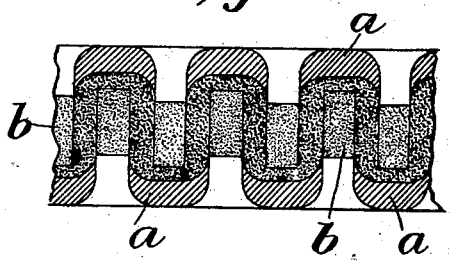
Figure 3:
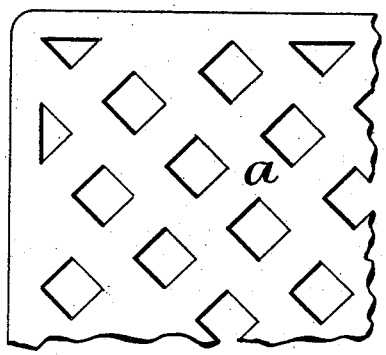
Figure 4:
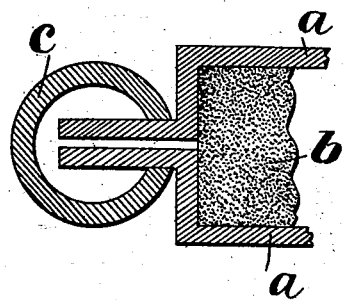

In the drawings, Figures 1 and 2 show sectional views of two forms. Fig. 3 is a plan view. Fig. 4 is a sectional view of the edges and means for holding said edges together, and Fig. 5 is a plan view of said holding means as applied to a complete electrode.

Figure 5:
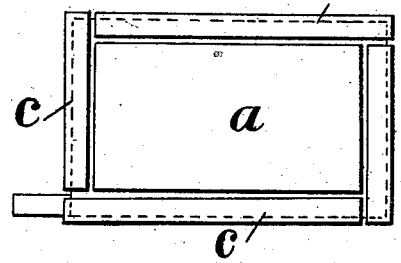

The plates $a$ may consist of one piece bent around the mass-core $b$, or they may be made in the manner shown in Figs. 4 and 5, where they are held together by slit tubes drawn over the adjacent edges.

According to my invention perforations are preferably made simultaneously from both sides under pressure with alternate pins extending only as far as the opposite lead plate, as shown in Figs. 1 and 2.

Electrodes prepared in this manner satisfy all the requirements, as, on the one hand, the contact-surfaces between the active mass and the electrolyte and between the material and the support are very large, and, on the other hand, the active material is inclosed as much as possible by the support, thus preventing breaking off of the mass.

Having thus described my invention, what I claim is—

1. An accumulator-electrode comprising active material, and an inclosing metal mantle and both together provided with a plurality of perforations arranged alternately on both sides of the electrode and reaching deeply into the active mass or material almost to the opposite side of the metal mantle so that the whole active mass is divided in many thin layers, but each of them being in contact with the lead mantle, substantially as and for the purpose set forth.

2. An accumulator-electrode comprising active material inclosed between perforated lead plates, said plates having laterally-extending flanges and slitted tubes embracing said flanges, substantially as described.

In testimony whereof I have hereunto set my hand in presence of two subscribing witnesses.

FRANZ HEIMEL.

Witnesses:
HENRY C. CARPENTER,
CHAS. E. CARPENTER.